(12) United States Patent
Lee et al.

(10) Patent No.: US 11,587,340 B2
(45) Date of Patent: Feb. 21, 2023

(54) CONTENT CAPTURING SYSTEM AND CONTENT CAPTURING METHOD

(71) Applicant: Quanta Computer Inc., Taoyuan (TW)

(72) Inventors: Chen-Chung Lee, Taoyuan (TW); Chia-Hung Lin, Taoyuan (TW); Ching-Shium Chen, Taoyuan (TW); Meng-Chia Chen, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 17 days.

(21) Appl. No.: 17/361,805

(22) Filed: Jun. 29, 2021

(65) Prior Publication Data
US 2022/0358319 A1 Nov. 10, 2022

(30) Foreign Application Priority Data
May 6, 2021 (TW) ................................. 110116318

(51) Int. Cl.
| | | |
|---|---|---|
| *G06V 30/00* | (2022.01) | |
| *G06V 30/148* | (2022.01) | |
| *G06N 3/02* | (2006.01) | |
| *G06V 30/414* | (2022.01) | |

(Continued)

(52) U.S. Cl.
CPC ............. *G06V 30/153* (2022.01); *G06N 3/02* (2013.01); *G06V 30/18057* (2022.01); *G06V 30/414* (2022.01); *G06V 30/10* (2022.01)

(58) Field of Classification Search
CPC ......... G06V 30/148–158; G06V 30/10; G06V 30/414
See application file for complete search history.

(56) References Cited

U.S. PATENT DOCUMENTS

| | | | |
|---|---|---|---|
| 6,035,061 A | * | 3/2000 | Katsuyama .......... G06V 30/416 |
| | | | 382/101 |
| 10,171,999 B2 | * | 1/2019 | Phillips ................ H04N 21/632 |
| 10,269,120 B2 | | 4/2019 | Kao et al. |

(Continued)

FOREIGN PATENT DOCUMENTS

| | | |
|---|---|---|
| CN | 1317673 C | 5/2007 |
| TW | 201820203 A | 6/2018 |

OTHER PUBLICATIONS

Chinese language office action dated Nov. 29, 2021, issued in application No. TW 110116318.

*Primary Examiner* — Sean T Motsinger

(74) *Attorney, Agent, or Firm* — McClure, Qualey & Rodack, LLP

(57) ABSTRACT

A content capturing system is suitable for capturing content in an image of a document. The content capturing system includes a processor and a storage device. The processor accesses the program stored in the storage device to implement a cutting module and a processing module. The cutting module receives a corrected image. The content in the corrected image includes a plurality of text areas, and the cutting module inputs the corrected image or a first text area into a convolutional neural network. The convolutional neural network outputs the coordinates of the first text area. The cutting module cuts the first text area according to the coordinates of the first text area. The cutting module inputs the cut first text area into a text recognition system and obtains a plurality of first characters in the first text area from the text recognition system.

10 Claims, 7 Drawing Sheets

(51) Int. Cl.
    *G06V 30/18*        (2022.01)
    *G06V 30/10*        (2022.01)

(56)            References Cited

U.S. PATENT DOCUMENTS

| | | | |
|---|---|---|---|
| 2003/0156754 A1* | 8/2003 | Ouchi | G06V 30/416 |
| | | | 382/176 |
| 2005/0271275 A1* | 12/2005 | Chang | G06V 10/42 |
| | | | 382/176 |
| 2009/0110287 A1* | 4/2009 | Bates | G09G 5/00 |
| | | | 382/298 |
| 2010/0259676 A1* | 10/2010 | Swan | H04N 21/4884 |
| | | | 348/468 |
| 2011/0063468 A1* | 3/2011 | Ahn | G06V 20/63 |
| | | | 348/222.1 |
| 2018/0150956 A1* | 5/2018 | Kao | G06V 10/82 |
| 2019/0108203 A1* | 4/2019 | Wang | G06V 10/82 |
| 2019/0130073 A1* | 5/2019 | Sun | G06K 9/6223 |
| 2019/0318163 A1* | 10/2019 | Pashintsev | G06V 30/414 |
| 2021/0034700 A1* | 2/2021 | Torres | G06V 10/267 |
| 2021/0034856 A1* | 2/2021 | Torres | G06V 30/412 |
| 2021/0224531 A1* | 7/2021 | Nakamura | H04N 1/00795 |

* cited by examiner

CONTENT CAPTURING SYSTEM AND CONTENT CAPTURING METHOD

CROSS REFERENCE TO RELATED APPLICATIONS

This application claims priority of Taiwan Patent Application No. 110116318, filed on May 6, 2021, the entirety of which is incorporated by reference herein.

BACKGROUND OF THE INVENTION

Field of the Invention

The present disclosure is related to a content capturing method and a content capturing system, and, in particular, it is related to a content capturing method and a content capturing system suitable for capturing content in an image of a document.

Description of the Related Art

Currently, among the technologies that use computer recognition technology for regional text extraction, optical character recognition (OCR) technology is perhaps the most widely used for images of documents. However, for specific applications that may be required by a user, OCR technology cannot perform the task effectively. Capturing a small area in a document image, such as capturing a certain field, may result in inaccurate reorganization results because the captured range is too small. Generally speaking, when there is more than one small field to be captured in a document image, the more small fields there are, the higher the error rate of OCR.

Therefore, how to accurately identify the content of a document image has become a problem that needs to be solved in this field.

BRIEF SUMMARY OF THE INVENTION

In accordance with one feature of the present invention, the present disclosure provides a content capturing system. The content capturing system is suitable for capturing content in an image of a document. The content capturing system includes a processor and a storage device. The processor is used to access the program stored in the storage device to implement a cutting module and a processing module. The cutting module is configured to receive a corrected image. The content in the corrected image includes a plurality of text areas, and the cutting module inputs the corrected image or a first text area into a convolutional neural network (CNN). The convolutional neural network outputs the coordinates of the first text area. The cutting module cuts the first text area according to the coordinates of the first text area, inputs the cut first text area into a text recognition system, obtains a plurality of first characters in the first text area from the text recognition system, calculates the number of first characters to obtain a first character number, and determines whether the first character number is above the character number threshold. When the cutting module determines that the number of first characters is above the character number threshold, the cutting module inputs the first text area into the convolutional neural network. When the cutting module determines that the number of first characters is below the character number threshold, the first text area is transmitted to the processing module. When the cutting module determines that the number of first characters is above the character number threshold, the first text area is input into the convolutional neural network, and based on the number of second characters in a second text area cut out according to the coordinates of the second text area output by the convolutional neural network, the cutting module determines whether the number of second characters is above the character number threshold, until the cutting module determines that the number of second characters is below the character number threshold, transmits the second text area to the processing module. The processing module is used to calculate an Intersection-over-Union of the first text area and the second text area, and when the processing module determines that the Intersection-over-Union is above the Intersection-over-Union threshold, both the first text area and the second text area are regarded as a target field, and at least one target text in the target field is obtained.

In accordance with one feature of the present invention, the present disclosure provides a content capturing method. The content capturing method is suitable for capturing content in an image of a document. The content capturing method includes the following steps: receiving a corrected image; wherein the content in the corrected image includes a plurality of text areas; inputting the corrected image or a first text area into a convolutional neural network (CNN), the convolutional neural network outputs coordinates of the first text area; cutting the first text area according to the coordinates of the first text area, inputting the cut first text area into a text recognition system, obtaining a plurality of first characters in the first text area from the text recognition system, calculating the number of first characters to obtain a first character number, and determining whether the first character number is above the character number threshold; wherein, when determining that the number of first characters is above the character number threshold, inputting the first text area into the convolutional neural network; wherein, when determining that the number of first characters is below the character number threshold, the first text area is transmitted to the processing module; wherein, when determining that the number of first characters is above the character number threshold, the first text area is input into the convolutional neural network, and based on the number of second characters in a second text area cut out according to the coordinates of the second text area output by the convolutional neural network, determining whether the number of second characters is above the character number threshold, until determining that the number of second characters is below the character number threshold, transmitting the second text area to the processing module; wherein, calculating an Intersection-over-Union of the first text area and the second text area using the processing module, and when determining that the Intersection-over-Union is above the Intersection-over-Union threshold, both the first text area and the second text area are regarded as a target field, and at least one target text in the target field is obtained.

The recognition accuracy of a target field in an invoice can be effectively improved by using the content capturing method and content capturing system. The content capturing method and content capturing system can be applied to an accounting system. When the manufacturer requests payment, an electronic file invoice will be uploaded by the system. In the content capturing method and content capturing system, at least one stage of block cutting is performed to capture multiple target fields. Later, using the text recognition system technology, the text contained in the target fields is extracted, while at the same time, the data in the content capturing system is compared with the recognized information (that is, the content of the target field) using a friendly user interface, so as to help internal accounting personnel to review it quickly. This effectively reduces the time required for accounting entry and review, and reduces human error, and indeed achieves new applications of artificial intelligence in accounting.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or elements, but do not preclude the presence or addition of one or more other features, integers, steps, operations, elements, elements, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
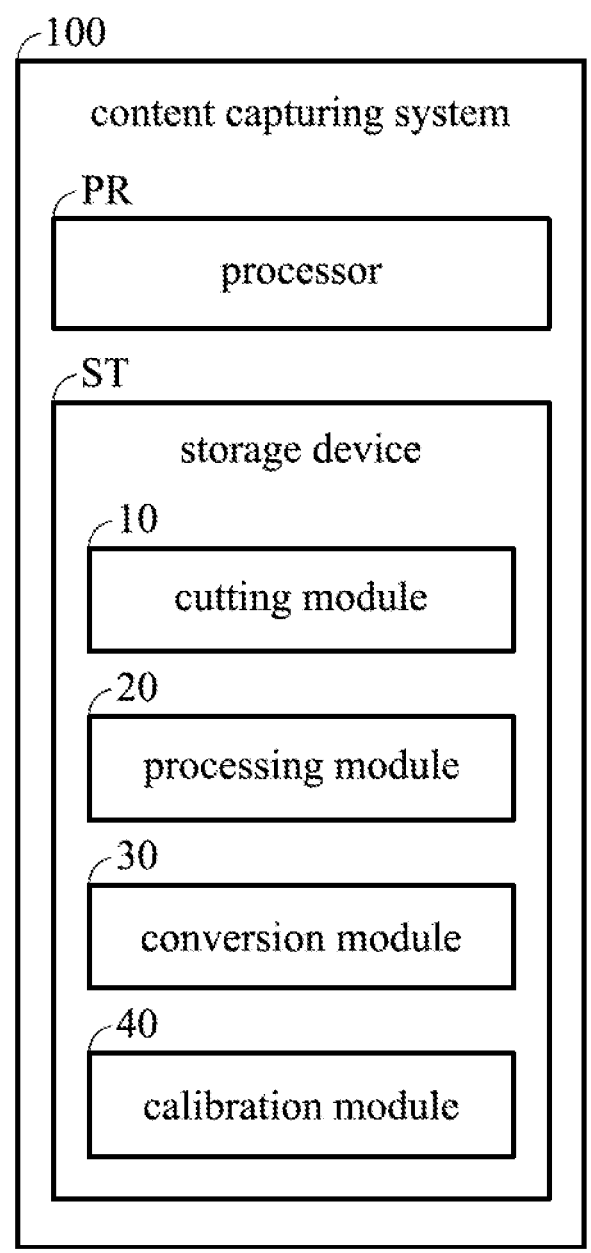
FIG. 1 is a block diagram of a content capturing system in accordance with one embodiment of the present disclosure.

Please refer to FIG. 1. FIG. 1 is a block diagram of a content capturing system 100 in accordance with one embodiment of the present disclosure. The content capture system 100 includes a processor PR and a storage device ST. In one embodiment, the content capturing system 100 is, for example, a computer, a server, or other electronic devices including a processor PR and a storage device ST.

In one embodiment, the processor PR accesses and executes programs stored in the storage device ST to implement a cutting module 10 and a processing module 20. In one embodiment, the processor PR accesses and executes programs stored in the storage device ST to implement the cutting module 10, the processing module 20, a conversion module 30, and a calibration module 40.

In one embodiment, the cutting module 10, the processing module 20, a conversion module 30, and a calibration module 40 can be implemented using software or firmware individually or together. In one embodiment, the processor PR is used to access the respective calculation results of the cutting module 10, the processing module 20, the conversion module 30, and the calibration module 40 in the storage device ST.

In one embodiment, the storage device ST can be implemented as a read-only memory, flash memory, floppy disk, hard disk, optical disk, pen drive, tape, or network accessible database or those familiar with the art can easily think of storage media with the same function to implement it.

In one embodiment, the cutting module 10, the processing module 20, the conversion module 30, and the calibration module 40 can be implemented by hardware circuits individually or in combination. For example, the cutting module 10, the processing module 20, the conversion module 30, and the calibration module 40 can be composed of active components (such as switches, transistors) and passive components (such as resistors, capacitors, and inductors). In an embodiment, the cutting module 10, the processing module 20, a conversion module 30, and a calibration module 40 can be located outside the storage device ST, and are each coupled to the processor PR.

In one embodiment, the cutting module 10, the processing module 20, the conversion module 30, and the calibration module 40 are implemented by one or more processors each or together. The processors can be implemented by integrated circuits such as micro controller, microprocessor, digital signal processor (DSP), field programmable gate array (FPGA), application specific integrated circuit (ASIC) or a logic circuit.

Figure 2:
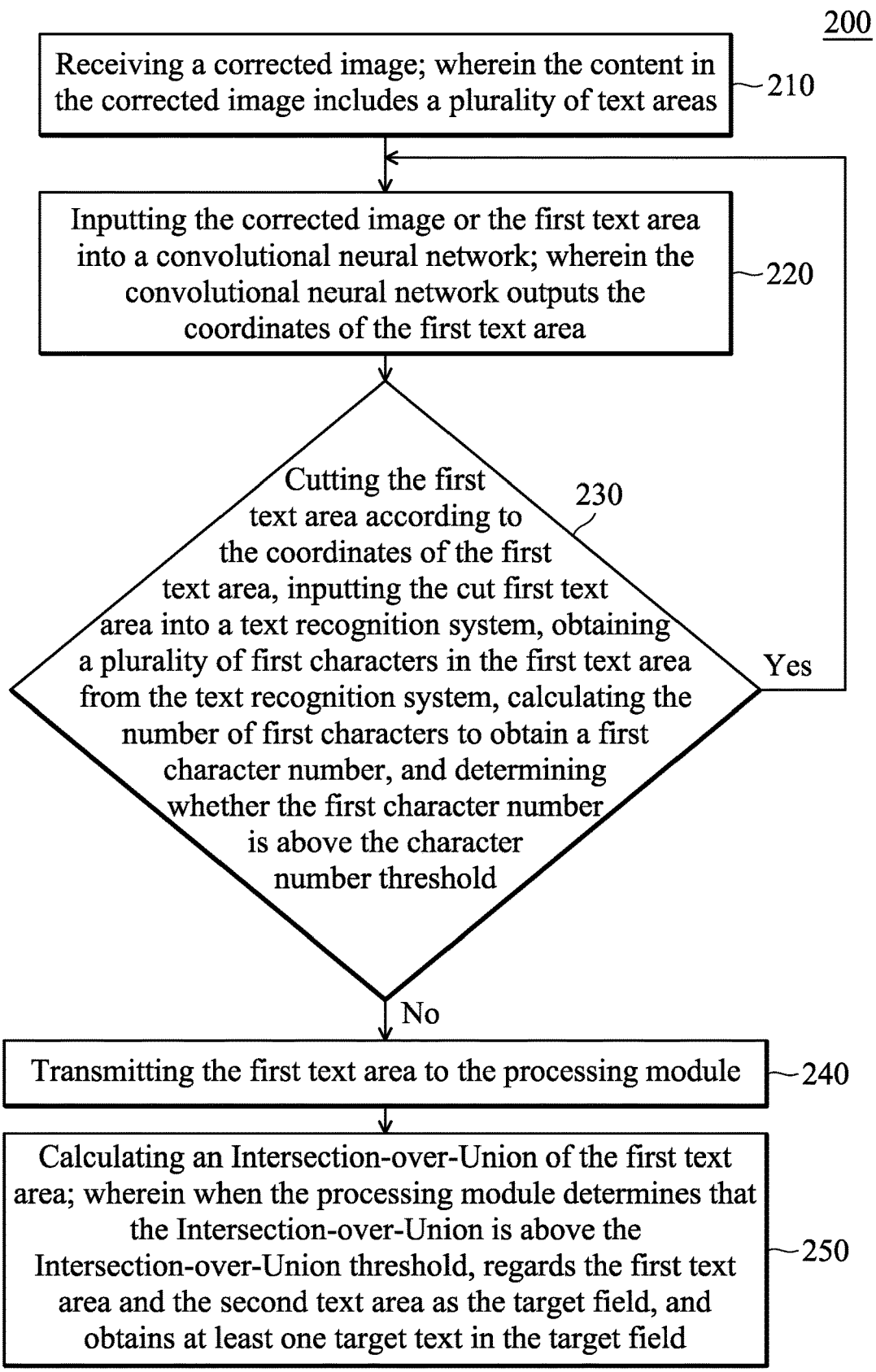
FIG. 2 is a flowchart of a content capturing method in accordance with one embodiment of the present disclosure.
Figure 3:
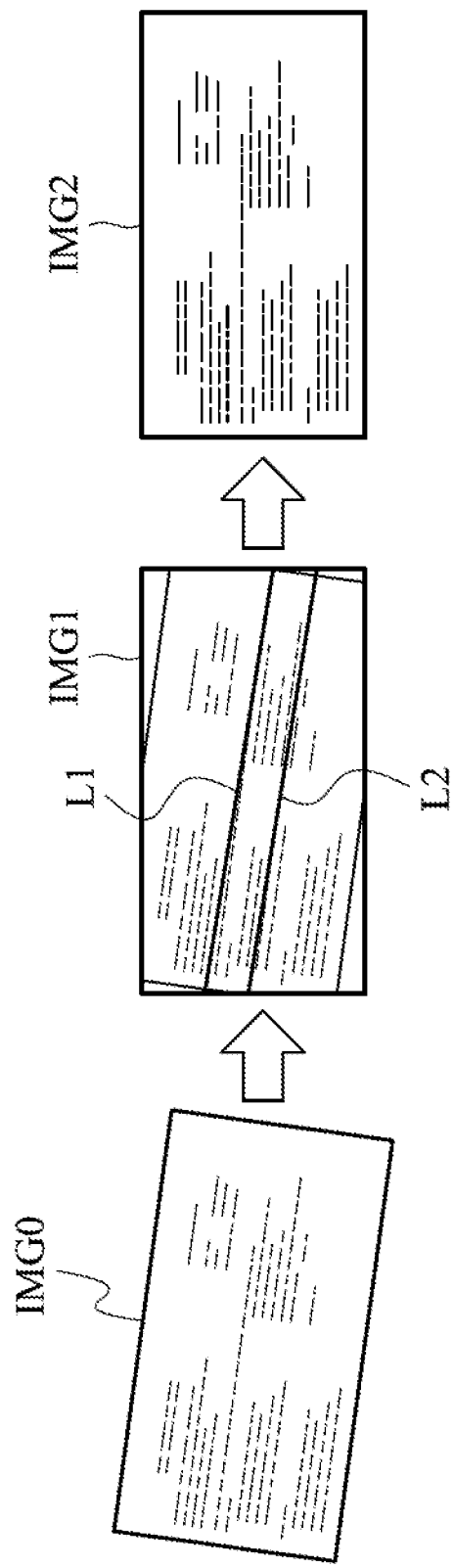
FIG. 3 is a schematic diagram of generating a corrected image in accordance with one embodiment of the present disclosure.
Figure 4:
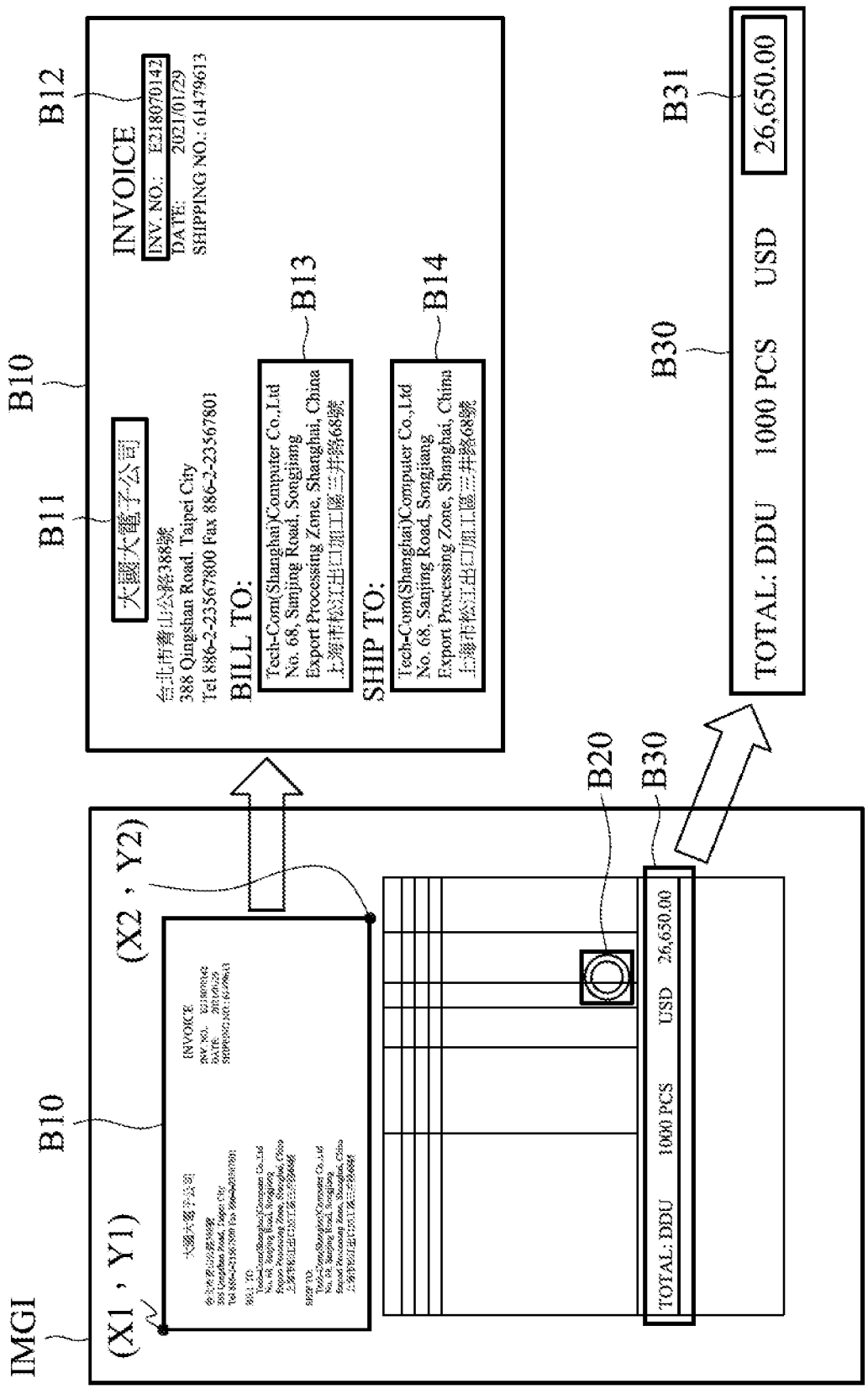
FIG. 4 is a schematic diagram of a cut text area in accordance with one embodiment of the present disclosure.
Figures 5, 6A:
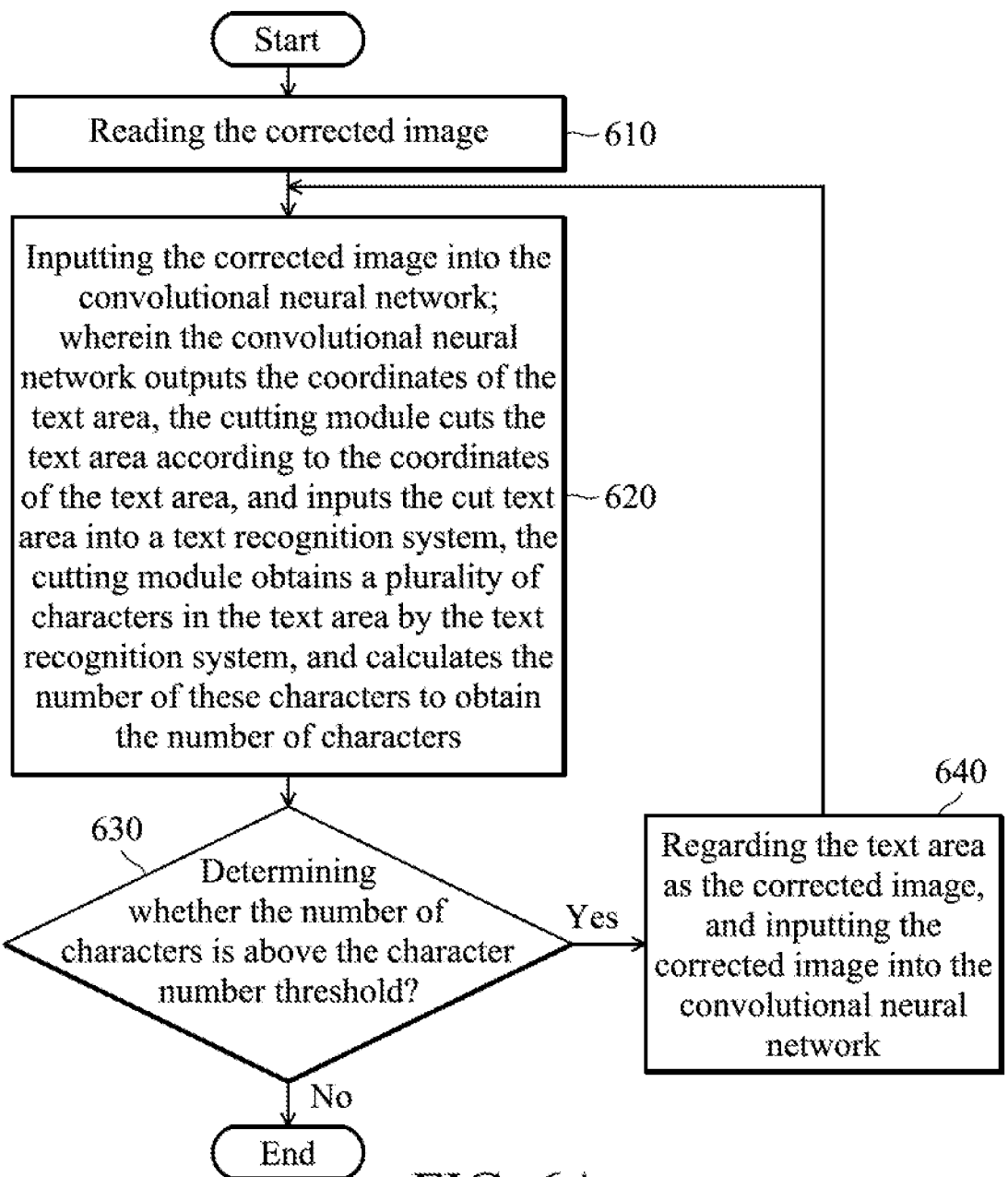
FIG. 5 is a schematic diagram of a cut text area in accordance with one embodiment of the present disclosure.
FIG. 6A is a flowchart of cutting a text area in accordance with one embodiment of the present disclosure.

Please refer to FIGS. 2-5. FIG. 2 is a flowchart of a content capturing method 200 in accordance with one embodiment of the present disclosure. FIG. 3 is a schematic diagram of generating a corrected image IMG2 in accordance with one embodiment of the present disclosure. FIG. 4 is a schematic diagram of a cut text area in accordance with one embodiment of the present disclosure. FIG. 5 is a schematic diagram of a cut text area in accordance with one embodiment of the present disclosure. The content capturing method 200 can be implemented by the components shown in FIG. 1.

In one embodiment, the processor PR is used to access the cutting module 10 and the processing module 20, or to access and execute programs/algorithms in the storage device ST, to implement the functions of the cutting module 10 and the processing module 20. In one embodiment, when the cutting module 10 and the processing module 20 are implemented by hardware (for example, a chip or a circuit), they can perform calculations on their own after receiving data or signals, and return the processing results to the processor PR. In one embodiment, when the cutting module 10 and the processing module 20 are implemented using software (for example, an algorithm), the processor PR executes the algorithm in the cutting module 10 and the processing module 20 to obtain the processing result.

In step 210, the cutting module 10 receives a corrected image, wherein the content in the corrected image includes a plurality of text areas.

In one embodiment, the conversion module 30 is used to receive a file and convert the file into an initial input image conforming to an image file format. More specifically, the user can transfer the file to the content capturing system 100 through a user interface, and after the conversion module 30 obtains the file, the conversion module 30 converts the file format, and confirms whether it is a normal and processable image format according to the file format uploaded by the user. In one embodiment, when the conversion module 30 determines that the file format uploaded by the user is a PDF file (a PDF file refers to a portable document format file), the conversion module 30 will perform page conversion, each page of the PDF file is converted into a single image file. For example, the PDF file has 10 pages, and the conversion module 30 converts each page of the PDF file into an initial input image that conforms to the JPG format (JPG is the abbreviation of Joint Photographic Equipment Group and also called JPEG, it is the image processing format ordered by the United Imaging Equipment Group). Therefore, the 10-page PDF file will be converted into 10 initial input images in JPG format, and each initial input image, the original file name of the initial input image, the converted new file name and path will be correspondingly saved to the storage device ST in the database.

If the file uploaded by the user already conforms to an image file format (for example, JPG format), the conversion module 30 does not need to convert the file format. The conversion module 30 directly treats the file as the initial input image, and saves this initial input image, the original file name, new file name and path of this initial input image correspondingly. In one embodiment, for the regularity of file names, the conversion module 30 converts the original file name into a new file name, so that all file names in the database in the storage device ST have regularity.

However, this is only an example. The format of the image file is not limited to the designated JPG file, and the file input by the user is not limited to PDF or JPG file.

In one embodiment, as shown in FIG. 3, the calibration module 40 is used to receive the initial input image IMG0 from the conversion module 30. When the calibration module 40 determines that the initial input image IMG0 is skewed, for example, using the standard Hough transform to calculate the linear angle, the linear skew state can be marked on the initial input image IMG0 (that is, shown in the image IMG1) through a line segment, and the image is corrected to the water sheet state according to the linear angle. In this way, the initial input image IMG0 is horizontally corrected to generate a corrected image IMG2.

In this way, the accuracy of subsequent image cutting can be improved. Generally, image cutting is cut in a rectangular manner, and non-horizontal text cutting can easily cause text omissions. Therefore, if the initial input image IMG0 is horizontally corrected, and the corrected image IMG2 is used for subsequent image cutting and text recognition, more accurate results can be obtained.

In step 220, the cutting module 10 inputs the corrected image IMGI or the first text area into a convolutional neural network (CNN), and the convolutional neural network outputs the coordinates of the first text area.

In one embodiment, the convolutional neural network is used to receive the corrected image (for example, the corrected image IMG2 in FIG. 3, and the following takes the larger corrected image IMGI in FIG. 4 as an example) or the ones that have been cut out from the text area (for example, the first text area), and then output the coordinates of the text area.

In one embodiment, the convolutional neural network is trained in advance through a large number of images with labeled text areas and fields, and the recognition accuracy is greater than a preset threshold. These labeled text areas and fields are, for example, "company", "INVOICE", "BILL TO:", "SHIP TO:" . . . and other target fields or target text areas.

The cutting module 10 input the corrected image IMGI into a convolutional neural network. As shown in FIG. 4, the convolutional neural network outputs the coordinates of multiple text areas B10, B20, and B30. For example, the text area B10 can be represented by two sets of coordinates (X1, Y1) and (X2, Y2). Other text areas (for example, text areas B20, B30) can also be represented by coordinates, so they will not be described in detail.

In step 230, the cutting module 10 cuts the first text area (for example, the text area B10) according to the coordinates of the first text area, inputs the cut first text area into a text recognition system, obtains a plurality of first characters in the first text area (for example, multiple characters in the text area B10) from the text recognition system, calculates the number of first characters to obtain a first character number, and determines whether the first character number is above the character number threshold (i.e., an upper limit to the number of characters).

When the cutting module 10 determines that the first character number is above the character number threshold, step 220 is executed. When the cutting module 10 determines that the first number of characters is below the threshold value of the number of characters, step 240 is executed.

For example, the character number threshold is 300. If the number of characters in the text area B10 is 350, the cutting module 10 determines that the number of characters in the text area B10 is above the character number threshold, so step 220 is executed, and the text area B10 is input into the convolutional neural network.

In another example, the character number threshold is 300. If the number of characters in the text area B10 is 200, the cutting module 10 determines that the number of characters in the text area B10 is below the character number threshold, so step 240 is executed.

In one embodiment, when the convolutional neural network receives the cut-out text area (for example, the text area B10), it means that the cut-out text area is not accurate enough. For example, it may contain too many words. The coordinates of the text area are analyzed by the convolutional neural network again.

In one embodiment, the character recognition system is, for example, an OCR system, which can analyze and recognize the character data of an image file and output characters.

When the cutting module 10 determines that the first number of characters is above the character number threshold, the first text area (for example, the text area B10) is input into the convolutional neural network. And, according to the cut-out text area of the coordinates of a second text area output by the convolutional neural network (for example, the output text area B11, B12, B13, B14 of the convolutional neural network), the cutting module 10 determines whether the second number of characters is above the character number threshold (for example, the cutting module 10 determines whether the number of characters in each text area B11, B12, B13, B14 is above the character number threshold), until the cutting module 10 determines that the number of second characters is below the character number threshold, the second text area is sent to the processing module 10.

For example, the cutting module 10 determines that the number of characters in each text area B11, B12, B13, B14 is less than the character number threshold, and transmits these text areas B11, B12, B13, B14 to the processing module 10. If there is still a text area in which the number of characters is above the character number threshold, that text area will be regarded as the corrected image IMGI and input into the convolutional neural network again (step 220 is performed for this text area).

As shown in FIG. 4, the cutting module 10 first determines that the number of characters in the text area B10 (considered as the first text area) is above the character number threshold, so the text area B10 is input into the convolutional neural network. This time the convolutional neural network outputs the coordinates of the text areas B11, B12, B13, B14 (each is regarded as the second text area). Through the text recognition system, the characters in each text area B11, B12, B13, and B14 can be recognized. The cutting module 10 determines that the number of characters in each text area B11, B12, B13, and B14 is less than the character number threshold, and transmits these text areas B11, B12, B13, and B14 to the processing module 10.

In addition, the cutting module 10 first determines that the number of characters in the text area B30 (which is regarded as the first text area) is above the character number threshold, so the text area B30 is input into the convolutional neural network. This time the convolutional neural network outputs the coordinates of the text area B31 (considered as the second text area). Through the text recognition system, the characters in each text area B31 can be recognized. The cutting module 10 determines that the number of characters in the text area B31 is still above the character number threshold, and then regards the text area B31 as the corrected image IMGI, and enters the convolutional neural network again (step 220 is performed for this text area).

As shown in FIG. 5, this time the convolutional neural network outputs the coordinates of the text areas B32, B33, B34 (considered as the third text area). Through the text recognition system, the characters in each text area B32, B33, B34 can be recognized. The cutting module 10 determines that the number of characters in each character area B32, B33, and B34 is less than the character number threshold, and transmits these character areas B32, B33, and B34 to the processing module 10.

It can be seen from the above that through multiple recursive cutting, the cutting module 10 can cut out 7 text areas B11, B12, B13, B14, B32, B33, and B34.

In one embodiment, when the position and the number of characters in the cut text area are appropriate, the processing module 20 can learn the content in each text area through the assistance of the text recognition system. For example, the text area B32 represents the total amount of 3000, the text area B33 represents the currency is USD, and the text area B34 represents the total amount is 2545.

In step 240, the cutting module 10 transmits the first text area to the processing module 20.

In the examples shown in FIGS. 4 and 5, the cutting module 10 transmits seven text areas B11, B12, B13, B14, B32, B33, and B34 to the processing module 20. In other words, the cutting module 10 transmits the text regions (for example, the first text region and the second text region) corresponding to the character number threshold calculated in each round to the processing module 20.

In step 250, the processing module 20 calculates an Intersection-over-Union (IoU) of the first text area (for example, the text area B10) and the second text area (for example, the text area B11). When the processing module 20 determines that the Intersection-over-Union is above the Intersection-over-Union threshold (i.e., threshold value of the Intersection-over-Union), regards the first text area and the second text area as the target field, and obtains at least one target text in the target field.

Figure 6B:
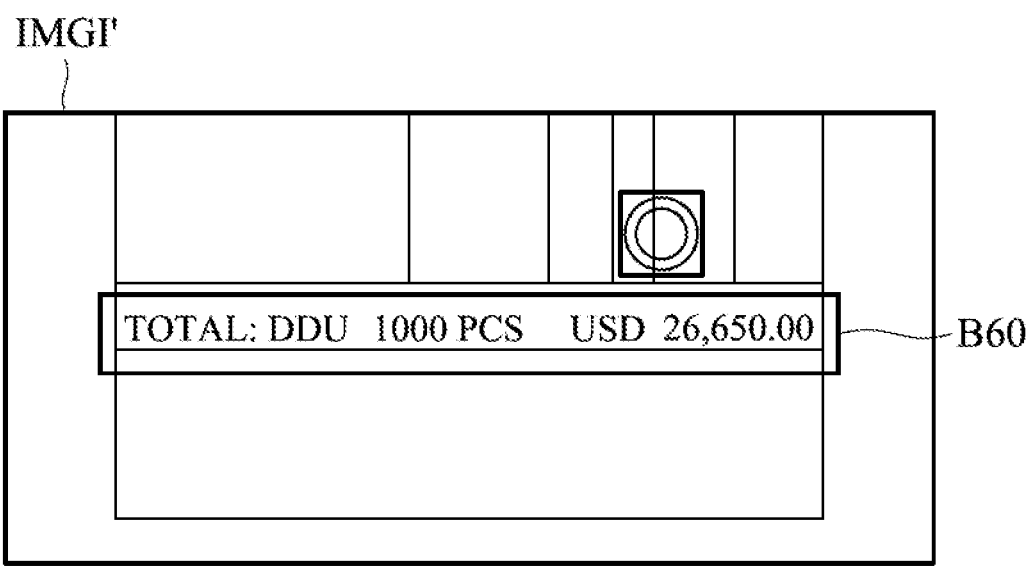
FIGS. 6B-6C are schematic diagrams showing a cut text area in accordance with one embodiment of the present disclosure.
Figure 6C:
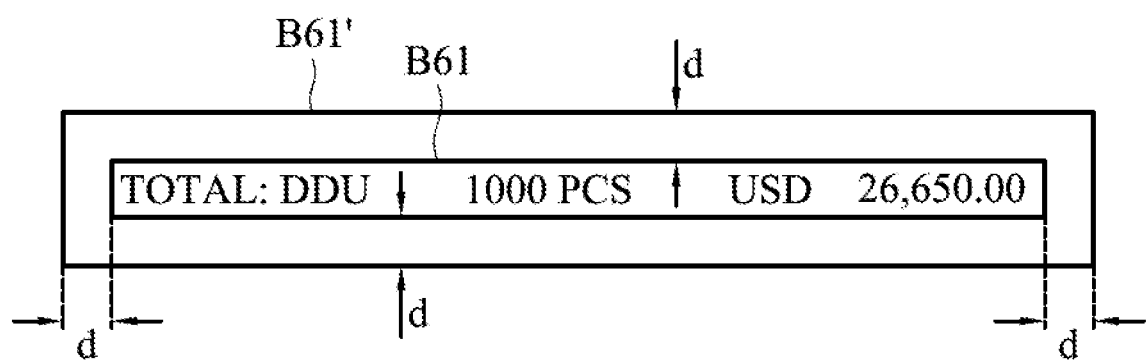
Figure 6D:
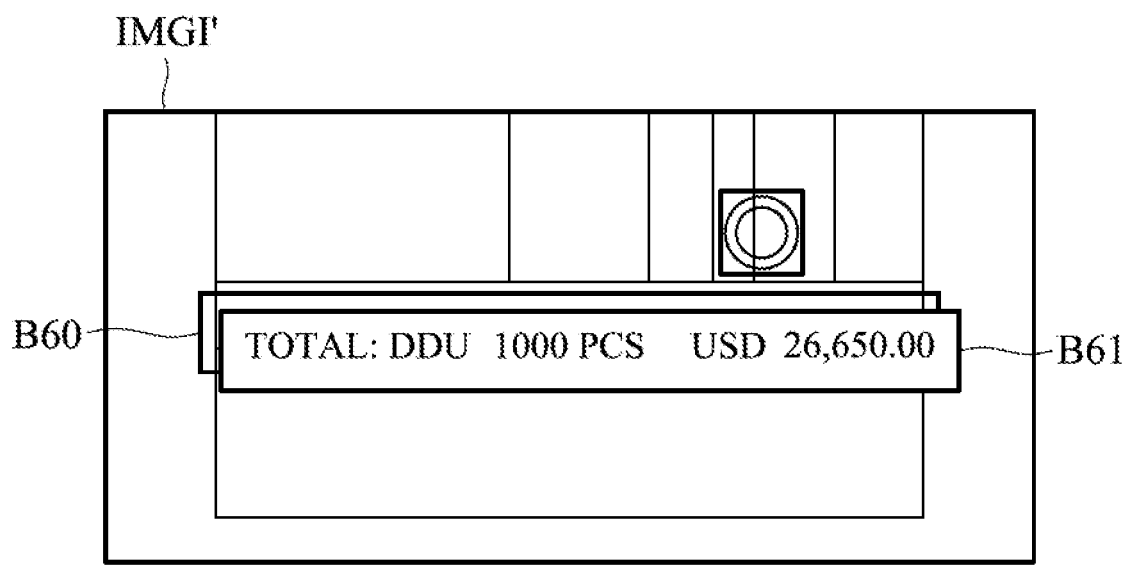
FIG. 6D is a schematic diagram of calculating the Intersection-over-Union in accordance with one embodiment of the present disclosure.

FIG. 6A is a flowchart of cutting a text area in accordance with one embodiment of the present disclosure. The steps in FIG. 6A are used to explain step 230 in more detail. FIGS. 6B-6C are schematic diagrams showing a cut text area in accordance with one embodiment of the present disclosure. FIG. 6D is a schematic diagram of calculating the Intersection-over-Union in accordance with one embodiment of the present disclosure. FIG. 6D is used to explain step 250 in more detail.

In step 610, the cutting module 10 reads the corrected image IMGI'. In step 620, the cutting module 10 inputs the corrected image IMGI' into the convolutional neural network, and the convolutional neural network outputs the coordinates of the text area (such as text area B60). The cutting module 10 cuts the text area according to the coordinates of the text area, and inputs the cut text area into a text recognition system. The cutting module 10 obtains a plurality of characters in the text area by the text recognition system, and calculates the number of these characters to obtain the number of characters. In step 630, the cutting module 10 determines whether the number of characters is above the character number threshold; if so, in step 640, the cutting module 10 regards the text area as the corrected image IMGI', and enters step 620 again (will obtain text area B61); if not, the process ends.

In one embodiment, before each end of the process, the cutting module 10 transmits a text block corresponding to the threshold value below the character number threshold to the processing module 20.

In this example, if the second cutting is performed in step 640, the final processing module 20 obtains the second text area (the second text area is, for example, the text area B61, assuming that the number of characters in the second text area B61 is below the character number threshold), since the area range of the second text area B61 is cut again, it is usually smaller than the area range of the first text area B60. Therefore, in one embodiment, when the processing module 20 determines that the distance between the second text area B61 and the edge of the image is less than an edge distance (for example, 0.1 cm), the boundary of the second text area B61 is compensated by the blank (for example, add the white border d to the length and width of the second text area B61, and the white border d is, for example, 0.2 cm) to generate a compensated text area B61'.

The processing module 20 is configured to calculate the Intersection-over-Union between the first text area B60 and the compensated text area B61'. When the processing module 20 determines that the Intersection-over-Union is above the Intersection-over-Union threshold, both the first text area B60 and the second text area B61 are regarded as the target field.

The Intersection-over-Union is a concept used in target detection referring to the overlap rate between the generated candidate boundary and the ground truth bound; That is, the ratio of their intersection and union. The candidate bound of the present invention refers to the current text area, and the ground truth bound refers to the previous text area. For example, if the current text area is the second text area, the previous text area is the first text area. In another example, if the current text area is the third text area, the previous text area is the second text area. The Intersection-over-Union is a known calculation method, so it won't be described here.

In one embodiment, as shown in FIG. 6D, the processing module 20 calculates Intersection-over-Union according to the processing module 20 overlaps the coordinates of the first text area B60 in the corrected image IMGI' with the coordinates of the second text area B61 (or the compensated text area B61') in the corrected image IMGI'.

When the processing module 20 determines that the Intersection-over-Union is below the Intersection-over-Union threshold (for example, 80%), it means that the second text area B61 has a convergence effect after being cut, so the second text area B61 is input into the convolutional neural network again. At this time, it is equivalent to performing step 620, the second text area B61 is regarded as the corrected image IMGI' input into the convolutional neural network, and the subsequent process is executed until the process of cutting the text area ends.

When the processing module 20 determines that the Intersection-over-Union is above the Intersection-over-Union threshold (for example, 80%), it means that the overlap rate of the second text area B61 and the first text area B60 is very high. After the second cutting, the results of the two are almost the same, so the process can be ended. The processing module 20 regards both the first text area B60 and the second text area B61 as a target field, and obtains multiple target texts in the target field obtained through the text recognition system.

Similarly, in the examples shown in FIGS. 4 and 5, the cutting module 10 transmits the 7 text areas B11, B12, B13, B14, B32, B33, and B34 to the processing module 20, and the processing module 20 calculates the Intersection-over-Union of the current text area and the previous text area of these 7 text areas. When the processing module 20 determines that the Intersection-over-Union is above the Intersection-over-Union threshold, the current text area and the previous text area are regarded as target fields, and at least one target text in the target field is obtained.

In this way, after each of the 7 text areas has been cut one or more times, the processing module 20 can finally regard these 7 text areas as a target field, and obtain the target text in the target field.

In addition, dynamically increasing the blank edge (or empty margin) of the text area can prevent the font from being too close to the edge of the image and affecting the cutting accuracy. In addition, using the Intersection-over-Union as a criterion, the number of cuts of the image can be quickly converged.

The recognition accuracy of a target field in an invoice document can be effectively improved by using the content capturing method and content capturing system. The content capturing method and content capturing system can be applied to an accounting system. When a manufacturer requests payment, an electronic file invoice will be uploaded by the system. Through the content capturing method and content capturing system, at least one stage of block cutting is performed to capture multiple target fields. Later, through the text recognition system technology, the contained text is extracted, and at the same time, the data in the content capturing system is compared with the recognized information (that is, the content in the target field) through a friendly user interface, so as to help internal accounting personnel to quickly review. This effectively reduces the time for accounting entry and review, and reduces errors caused by human operations, and indeed achieves new applications of artificial intelligence in accounting.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A content capturing system suitable for capturing content in an image of a document, the content capturing system comprising:

a processor; and a storage device; wherein the processor is used to access the program stored in the storage device to implement a cutting module and a processing module;

wherein the cutting module is configured to receive a corrected image, wherein the content in the corrected image includes a plurality of text areas, and the cutting module inputs the corrected image or a first text area into a convolutional neural network (CNN), the convolutional neural network outputs coordinates of the first text area, the cutting module cuts the first text area according to the coordinates of the first text area, inputs the cut first text area into a text recognition system, obtains a plurality of first characters in the first text area from the text recognition system, calculates a number of first characters to obtain a first character number, and determines whether the first character number is above a character number threshold;

wherein, when the cutting module determines that the number of first characters is below the character number threshold, the first text area is transmitted to the processing module, and the processing module calculates an Intersection-over-Union of the first text area and a previous text area, and when determining that the Intersection-over-Union is above an Intersection-over-Union threshold, both the first text area and the previous text area are regarded as a target field, and at least one target text in the target field is obtained;

wherein, when the cutting module determines that the number of first characters is above the character number threshold, the first text area is input into the convolutional neural network, and based on a number of second characters in a second text area cut out according to coordinates of the second text area output by the convolutional neural network, the cutting module determines whether the number of second characters is above the character number threshold, when the cutting module determines that the number of second characters is below the character number threshold, the cutting module transmits the first text area and the second text area to the processing module, and the processing module is used to calculate an Intersection-over-Union of the first text area and the second text area, and when the processing module determines that the Intersection-over-Union of the first text area and the second text area is above the Intersection-over-Union threshold, both the first text area and the second text area are regarded as the target field, and the at least one target text in the target field is obtained.

2. The content capturing system of claim 1, wherein the processing module compensates the blank for the empty margins of the second text area to generate a compensated text area, and the processing module is used to calculate the Intersection-over-Union of the first text area and the compensated text area;
when the processing module determines that the Intersection-over-Union is above the Intersection-over-Union threshold, both the first text area and the second text area are regarded as the target field.

3. The content capturing system of claim 1, wherein the processor is used to access the program stored in the storage device to implement a conversion module; and
the conversion module is configured to receive a file and convert the file into an initial input image conforming to an image file format.

4. The content capturing system of claim 3, wherein the processor is used to access the program stored in the storage device to implement a calibration module; and
the calibration module is configured to receive the initial input image and perform a horizontal correction on the initial input image to generate the corrected image.

5. The content capturing system of claim 1, wherein the processing module overlaps the coordinates of the first text area in the corrected image with the coordinates of the second text area in the corrected image to calculate the Intersection-over-Union of the first text area and the second text area;
wherein, when the processing module determines that the Intersection-over-Union of the first text area and the second text area is below the Intersection-over-Union threshold, the second text area is input into the convolutional neural network again.

6. A content capturing method is suitable for capturing content in an image of a document, the content capturing method comprising:
receiving a corrected image; wherein the content in the corrected image includes a plurality of text areas;
inputting the corrected image or a first text area into a convolutional neural network (CNN), and the convolutional neural network outputs the coordinates of the first text area;
cutting the first text area according to the coordinates of the first text area, inputting the cut first text area into a text recognition system, obtaining a plurality of first characters in the first text area from the text recognition system, calculating a number of first characters to obtain a first character number, and determining whether the first character number is above the character number threshold;
wherein, when determining that the number of first characters is below the character number threshold, the first text area is transmitted to a processing module, and the processing module calculates an Intersection-over-Union of the first text area and a previous text area, and when determining that the Intersection-over-Union is above an Intersection-over-Union threshold, both the first text area and the previous text area are regarded as a target field, and at least one target text in the target field is obtained;
wherein, when determining that the number of first characters is above the character number threshold, the first text area is input into the convolutional neural network, and based on a number of second characters in a second text area cut out according to the coordinates of the second text area output by the convolutional neural network, determining whether the number of second characters is above the character number threshold, and when it is determined that the number of second characters is below the character number threshold, the second text area is transmitted to the processing module, transmitting the first text area and the second text area to the processing module,
and the processing module calculates an Intersection-over-Union of the first text area and the second text area, and when determining that the Intersection-over-Union of the first text area and the second text area is above the Intersection-over-Union threshold, both the first text area and the second text area are regarded as the target field, and the at least one target text in the target field is obtained.

7. The content capturing method of claim 6, further comprising:
compensating blank to the boundary of the second text area to generate a compensated text area via the processing module, and
calculating the Intersection-over-Union of the first text area and the compensated text area using the processing module; wherein
when the processing module determines that the Intersection-over-Union is above the Intersection-over-Union threshold, both the first text area and the second text area are regarded as the target field.

8. The content capturing method of claim 1, further comprising:
receiving a file and converting the file into an initial input image conforming to an image file format using the processing module.

9. The content capturing method of claim 6, further comprising:
receiving the initial input image and performing horizontal correction on the initial input image to generate the corrected image.

10. The content capturing system of claim 6, further comprising:
overlapping the coordinates of the first text area in the corrected image with the coordinates of the second text area in the corrected image to calculate the Intersection-over-Union of the first text area and the second text area using the processing module;
wherein, when the processing module determines that the Intersection-over-Union of the first text area and the second text area is below the Intersection-over-Union threshold, the second text area is input into the convolutional neural network again.

* * * * *